(12) United States Patent
Luo

(10) Patent No.: US 12,109,613 B2
(45) Date of Patent: Oct. 8, 2024

(54) ADDITIVE MANUFACTURING SYSTEMS AND ASSOCIATED METHODS

(71) Applicant: BATTELLE SAVANNAH RIVER ALLIANCE, LLC, Aiken, SC (US)

(72) Inventor: Yuefeng Luo, North Augusta, SC (US)

(73) Assignee: Battelle Savannah River Alliance, LLC, Aiken, SC (US)

( * ) Notice: Subject to any disclaimer, the term of this patent is extended or adjusted under 35 U.S.C. 154(b) by 0 days.

(21) Appl. No.: 17/518,665

(22) Filed: Nov. 4, 2021

(65) Prior Publication Data

US 2022/0314324 A1    Oct. 6, 2022

Related U.S. Application Data

(60) Provisional application No. 63/169,430, filed on Apr. 1, 2021.

(51) Int. Cl.
| | |
|---|---|
| *B22F 10/28* | (2021.01) |
| *B22F 12/37* | (2021.01) |
| *B22F 12/41* | (2021.01) |
| *B22F 12/67* | (2021.01) |
| *B33Y 10/00* | (2015.01) |
| *B33Y 30/00* | (2015.01) |

(52) U.S. Cl.
CPC .............. *B22F 10/28* (2021.01); *B22F 12/37* (2021.01); *B22F 12/41* (2021.01); *B22F 12/67* (2021.01); *B33Y 10/00* (2014.12); *B33Y 30/00* (2014.12)

(58) Field of Classification Search
CPC .... B22F 12/30–49; B22F 12/60; B22F 12/67; B22F 12/70; B33Y 10/00; B33Y 30/00; B33Y 40/00; B33Y 40/10
See application file for complete search history.

(56) References Cited

U.S. PATENT DOCUMENTS

| | | |
|---|---|---|
| 4,973,158 A | 11/1990 | Marsh |
| 8,049,187 B2 | 11/2011 | Tachikawa |
| 9,873,228 B2 | 1/2018 | Suzuki et al. |
| 9,950,366 B2 | 4/2018 | Ackelid |
| 9,981,314 B2 | 5/2018 | Folgar et al. |
| 10,343,392 B2 | 7/2019 | Carter et al. |

(Continued)

FOREIGN PATENT DOCUMENTS

| | | |
|---|---|---|
| EP | 3789140 | 3/2021 |
| WO | WO 2020/072018 | 4/2020 |
| WO | WO 2021/003309 | 1/2021 |

OTHER PUBLICATIONS

International Search Report and Written Opinion for PCT/US2022/021947, dated Jul. 1, 2022, 11 pages.

(Continued)

*Primary Examiner* — Keith Walker
*Assistant Examiner* — Ryan L Heckman
(74) *Attorney, Agent, or Firm* — Dority & Manning, P.A,

(57) ABSTRACT

Additive manufacturing systems and methods are provided. An additive manufacturing system includes a build volume; a powder disposed in the build volume, the powder occupying at least a portion of the build volume and having an outer boundary; a beam generator configured to generate a beam to irradiate the powder; and a ram defining a pass-through configured to transmit the beam to an irradiation location disposed within the outer boundary of the powder.

20 Claims, 12 Drawing Sheets

(56) References Cited

U.S. PATENT DOCUMENTS

| | | |
|---|---|---|
| 10,449,712 B2 | 10/2019 | Yoo et al. |
| 10,821,718 B2 | 11/2020 | Gold et al. |
| 10,967,566 B2 | 4/2021 | DeMuth et al. |
| 11,110,662 B2 | 9/2021 | Newell |
| 2008/0241404 A1 | 10/2008 | Allaman et al. |
| 2009/0242789 A1 | 10/2009 | Tachikawa |
| 2017/0050387 A1* | 2/2017 | Ederer .................. B29C 64/40 |
| 2017/0056975 A1 | 3/2017 | Carter et al. |
| 2017/0120537 A1* | 5/2017 | DeMuth ................ B33Y 80/00 |
| 2017/0203514 A1* | 7/2017 | McCoy ................ B29C 35/045 |
| 2017/0282245 A1* | 10/2017 | Yasuda ................ B29C 64/371 |
| 2018/0071948 A1* | 3/2018 | Campbell ............. B33Y 10/00 |
| 2018/0200791 A1* | 7/2018 | Redding .............. B29C 64/153 |
| 2018/0311731 A1* | 11/2018 | Spicer ................... B33Y 40/00 |
| 2018/0333778 A1 | 11/2018 | Sloderbeck et al. |
| 2018/0370213 A1 | 12/2018 | Gold et al. |
| 2019/0030606 A1 | 1/2019 | Mamrak |
| 2019/0030793 A1 | 1/2019 | Iwase |
| 2019/0084222 A1* | 3/2019 | Jones .................... B29C 64/241 |
| 2019/0134746 A1 | 5/2019 | Volk |
| 2019/0134853 A1 | 5/2019 | Iwatsuki et al. |
| 2019/0193154 A1* | 6/2019 | Ocken ................... B22F 10/28 |
| 2019/0210287 A1 | 7/2019 | Newell |
| 2020/0398482 A1 | 12/2020 | Tjellesen et al. |
| 2021/0178675 A1* | 6/2021 | Mamrak ................ B33Y 30/00 |

OTHER PUBLICATIONS

Kelly, et al. "Volumetric additive manufacturing via tomographic reconstruction" *Science* (2019) pp. 1-66.

Redwood, B. "Additive manufacturing technologies: An overview" *HUBS* (2021) pp. 1-10.

Zavala-Arredondo, et al. "Laser diode area melting for high speed additive manufacturing of metallic components" *Mater. Des.* 117 (2017) pp. 305-315.

\* cited by examiner

US 12,109,613 B2

ADDITIVE MANUFACTURING SYSTEMS AND ASSOCIATED METHODS

FEDERAL RESEARCH STATEMENT

This invention was made with Government support under Contract No. DE-AC09-08SR22470, awarded by the U.S. Department of Energy. The Government has certain rights in the invention.

FIELD

The present disclosure relates generally to additive manufacturing systems and methods, and more particularly, to additive manufacturing systems and methods where irradiation occurs within an outer boundary of a powder.

BACKGROUND

Several industries demand components which cannot be made using traditional manufacturing processes. Additive manufacturing allows these industries to meet increasing needs for specialized parts having, e.g., complex geometries. Additive manufacturing also enables the fabrication of complex parts without the typical tooling system including molds, dies, or contoured cutters, etc. Known techniques include, for example, photopolymerization manufacturing, selective laser sintering/melting, fused deposition modeling, material jetting, and direct energy deposition. However, each of these known techniques includes certain restrictions and limitations which limit applicability, economy, and part formation.

Accordingly, improved additive manufacturing systems and techniques are desired in the art. In particular, additive manufacturing systems and techniques allowing for manufacturing of higher precision and higher complexity parts with higher material quality would be advantageous.

BRIEF DESCRIPTION

Aspects and advantages of the invention in accordance with the present disclosure will be set forth in part in the following description, or may be obvious from the description, or may be learned through practice of the technology.

In accordance with an embodiment of the present disclosure, an additive manufacturing system can include a build volume; a powder disposed in the build volume, the powder occupying at least a portion of the build volume and having an outer boundary; a beam generator configured to generate a beam to irradiate the powder; and a ram defining a passthrough configured to transmit the beam to an irradiation location disposed within the outer boundary of the powder.

In accordance with another embodiment of the present disclosure, a method of additive manufacturing, the method comprising providing a powder in a build volume of an additive manufacturing system; and moving a ram tip of the additive manufacturing system to a location within the powder such that an irradiating beam transmitted through an opening in the ram tip irradiates the powder at an irradiation location disposed within an outer boundary of the powder.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Figure 1:
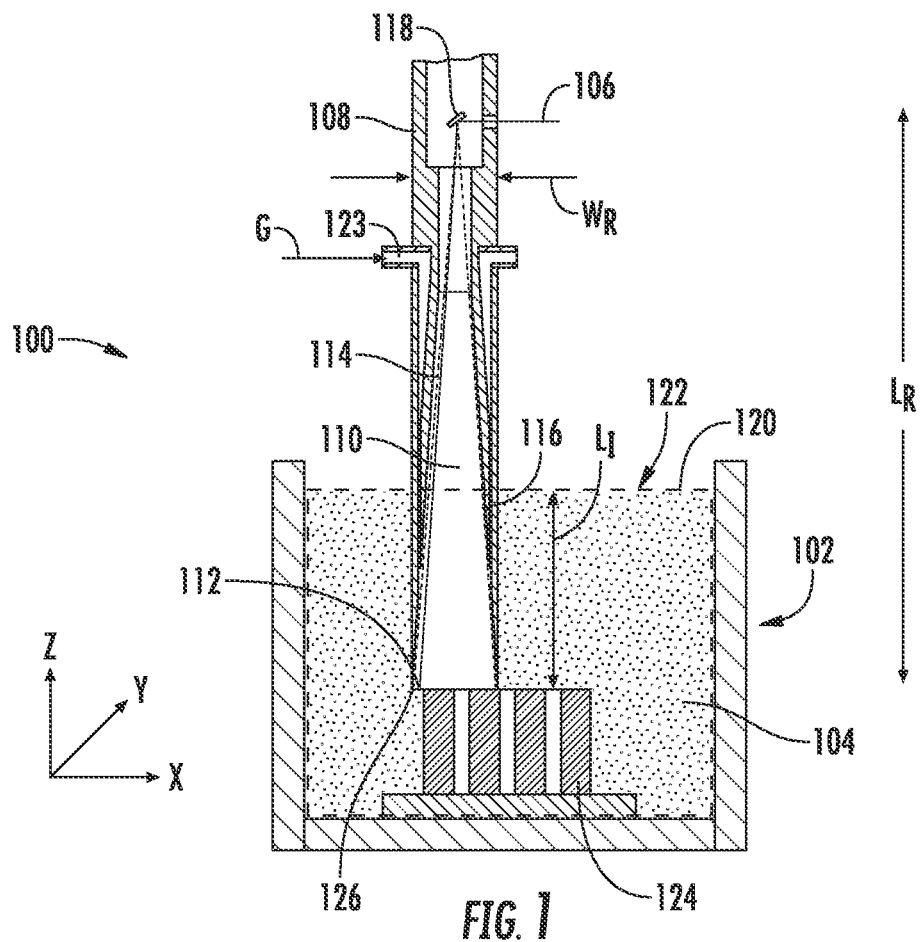
FIG. 1 is a cross-sectional side view of a system for additive manufacturing in accordance with an exemplary embodiment of the present disclosure.

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counterclockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, additive manufacturing systems and associated methods described herein allow for additive manufacturing operations, and more particularly, irradiation operations, at locations submerged within a build material. That is, unlike traditional additive manufacturing processes which occur at a surface level of the build material, embodiments described herein can enable manufacturing within the precursor build material. This can allow for previously unobtainable geometric structures, shorter build times, higher powder packing density, use of pre-installed feature(s) within the build volume, mitigation of ambient condition exposure, and more. In one or more embodiments, the build volume may be rotated with the additively manufactured article, or a portion thereof, disposed within the build volume. In some instances, conditions of the build material can be positively affected by the system prior to an irradiation step. For instance, a guide having a ramped surface can compact the powder immediately prior to irradiation. Even without the guide, compression from the ram can be applied to compact the powder through blade pressure, gravitational effect on the powder, side reactions, and bottom reaction. For shorter total build time, the laser selectively fuses and prepares the powder surface simultaneously, thus saving the frequent blade recoating pauses associated with traditional laser powder bed fusion. These and other benefits of the disclosure are described in greater detail below.

Referring now to the drawings, FIG. 1 illustrates a cross-sectional side view of an additive manufacturing system 100 in accordance with an exemplary embodiment described herein. The system 100 can generally include a build volume 102 configured to receive a build medium such as powder 104, a beam generator (not illustrated) configured to generate a beam 106 to selectively irradiate the powder 104, and a ram 108 defining a passageway 110 configured to transmit the beam 106 to an irradiation location 112 within the powder 104.

During additive manufacturing operations, the irradiation location 112 changes position within the build volume 102. That is, for example, the irradiation location 112 can move relative to the build volume 102 in an X-, Y-, Z-cartesian coordinate system. This can be performed by moving the ram 108, the build volume 102, rotating the reflection mirror, or a combination thereof relative to the other.

Movement of the ram 108 can be performed using one or more driving elements (not shown) such as one or more motors. By way of example, a first motor may control movement of the ram 108 in the X-direction. A second motor may control movement of the ram 108 in the Y-direction. A third motor may control movement of the ram 108 in the Z-direction. The motors can be operatively coupled with a logic device which can provide the motors with instructions to desirably move the irradiation location 112 with respect to the build volume 102. The motor denotes a motion control system including, for example, a motor, a leadscrew, a bearing, and a scale, among other elements.

In one or more embodiments, the irradiation location 112 can change position relative to the ram 108, and more particularly, relative to the passageway 110 of the ram 108. In some instances, the irradiation location 112 is centrally disposed within the passageway 110. In other instances, the irradiation location 112 can be moved between any two or more locations between a first side 114 of the passageway 110 and a second side 116 of the passageway 110. In one or more embodiments, the beam 106 can be moved relative to the passageway 110 in an area defined in the X-Y plane. That is, the beam 106 can be moved to any location within the passageway 110. In the scanning paths, the beam 106 can be turned off by a switch located, e.g., at a beam controller, where no surface cross-section needs to be fused according to the design. The beam 106 can then be turned on where surface cross-section is to be fused. As described in greater detail below, the beam 106 can oscillate on the irradiation location 112 according to a protocol, such as, e.g., a numerical programming. Moving the beam 106 with respect to the passageway 110 may be particularly useful when the ram 108 is operating near one or more pre-installed features. When operating the beam 106 near such pre-installed features, it may be necessary to reposition the beam 106 such that the irradiation location 112 is as close to the pre-installed feature as possible. By repositioning the beam 106 within the passageway 110, any clearance which might exist between the center of the passageway 110 and the pre-installed feature can be minimized, thus allowing for irradiation of powder 104 disposed immediately adjacent to the pre-installed feature.

In certain instances, the beam 106 may be directed through the passageway 110 using a mirror 118 or another similar reflective element. Angular orientation of the mirror 118 with respect to the passageway 110 may change as the mirror 118 is rotated. In this regard, the irradiation location 112 can be repositioned within the passageway 110 as necessary during additive manufacturing operations. Angular orientation of the mirror 118 may be controlled, for example, by one or more motors which can angularly adjust the orientation of the mirror 118. In an embodiment, the mirror 118 may be adjustable about a single rotation axis. For instance, the rotation axis may be disposed along the Y-axis. In another embodiment, the mirror 118 may be adjustable about two or more rotation axis. For instance, the motor may be movable about a first rotation axis disposed along the Y-axis and a second rotation axis disposed along the X-axis. By way of nonlimiting example, a first motor may control rotational position of the mirror 118 about the first rotation axis while a second motor controls rotational position of the mirror 118 about the second rotation axis. The first and second motors may be in communication with a logic device which can provide the motors with instructions to desirably reposition the mirror 118. Driven, e.g., by the mirror rotations, the laser can oscillate at high frequency to hatch a facet on the powder surface under the ram 108. In addition to the beam motion, the beam 106 can be turned on and off according to the need for surface fusion to control the outlines of surface cross-section.

The beam 106 is configured to selectively fuse the powder 104. Fusing can be performed by at least one of melting or sintering the powder 104. In an embodiment, the beam 106 can be an electromagnetic beam or a charged particle beam. In certain instances, the beam 106 can be a laser. In other instances, the beam 106 can be an electron stream. In an embodiment, the beam 106 can be generated by one beam generator (not shown). In another embodiment, the beam 106 can be generated by a plurality of beam generators (not shown).

In certain instances, the passageway 110 may contain an inert or nitrogen gas G. In another embodiment, the passageway 110 can operate in a vacuum state. In embodiments using inert gas, one or more gas passageways 123 may extend through the passageway 110 to circulate the gas G through the passageway 110. During irradiation (i.e., when the beam 106 is engaged), powder 104 may spatter within the passageway 110. The gas passageway 123 may be configured to facilitate removal of the spattered powder and irradiating gases from the irradiation location and to reduce the amount of spattered powder adhering to a wall of the passageway 110. As described in greater below, the gas passageways 123 may extend along the ram 108 to circulate gas G to locations adjacent to the powder 104.

The powder 104 can generally include a fusible powder. For example, the powder 104 may be metals, alloys, polymers, ceramics, composites, or any other suitable material. More specifically, according to exemplary embodiments of the present subject matter, the powder 104 can include a pure metal, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel®). These materials are examples of materials suitable for use in the additive manufacturing processes described herein. Other materials may be used in accordance with embodiments of the present disclosure without deviating from the scope of the disclosure.

The powder 104 disposed in the build volume 102 can generally conform to the shape of the build volume 102 such that an outer boundary 120 of the powder 104 corresponds with an internal shape of the build volume 102. In the exemplary embodiment depicted in FIG. 1, the outer boundary 120 of the powder 104 has a generally rectangular cross-sectional shape defined by a generally rectangular cross-sectional shape of the build volume 102. In other embodiments, the build volume 102 may have a non-rectangular, cross-sectional shape, including, for example, arcuate surfaces, stepped surfaces, faceted surfaces, or the like. The outer boundary 120 of the powder 104 may correspond in shape with any or all of such surfaces. That is, the powder 104 may conform to the build volume 102.

Prior to commencing manufacturing operations using the system 100, the powder 104 may define an open surface 122.

In the illustrated embodiment, the open surface 122 is an upper surface of the powder 104. The open surface 122 of the powder 104 can be exposed to the environment of the system 100. In some instances, the environment may be contained within an enclosure (not illustrated). In this regard, the environment may be controlled. For example, the environment may contain a particular type of gas, and may operate at a particular humidity, a particular temperature, and a particular pressure. Similarly, the environment may be otherwise controlled to effect a desirable characteristic for manufacturing.

In other embodiments, the open surface 122 of the powder 104 may be exposed to the ambient environment (i.e., the system 100 does not include an enclosure). In this regard, the powder 104 may be exposed to uncontrolled or semi-uncontrolled atmospheric conditions within the environment in which the system 100 is disposed. Manufacturing processes described herein may advantageously operate in ambient environments without incurring any negative effects (or at least minimal effects) caused by ambient conditions. Whereas traditional processes form objects at a surface level where the materials being manufactured are exposed to the ambient conditions during manufacturing operations, systems 100 in accordance with one or more embodiments described herein can manufacture objects below the surface level of the powder 104 where the impact of the ambient environment is reduced or even eliminated.

In accordance with embodiments described herein, during manufacturing operations, the irradiation location 112 is disposed within the outer boundary 120 of the powder 104. As used herein, "disposed within the outer boundary" is intended to refer to a condition whereby irradiation occurs within the volume of powder 104, i.e., at locations contained within the outer boundary 120. This is different from typical irradiating processes where irradiation occurs at an exposed surface of powder, i.e., a surface layer of powder is introduced over the previously irradiated layer of powder between formation of each layer. The surface layer of powder is irradiated and the process repeats. In contrast, systems 100 described herein do not require introduction of superficial powder layers between layers. Referring to FIG. 1, the irradiation location 112 may be disposed at an elevation (in the Z-direction) below the open surface 122. It should be understood that the system 100 described herein may additionally be configured to irradiate the powder 104 at the open surface 122 in addition to, or instead of, irradiating the powder 104 within the outer boundary 120.

The ram 108 defines a length, $L_R$ and a width, $W_R$. In an embodiment, the ram 108 can define an aspect ratio $[L_R/W_R]$ of at least 2.0, such as at least 5.0, such as at least 10.0, such as at least 25.0, such as at least 50.0, such as at least 100.0.

During manufacturing operations, the ram 108 may be inserted into the powder 104 an insertion distance, $L_I$. The insertion distance, $L_I$, can generally define the length of the ram 108 disposed within the outer boundary 120 at a given time. Accordingly, the insertion distance $L_I$ may change during the manufacturing operation, e.g., as each successive layer is formed. For example, upon completing irradiation of a layer of a manufactured article 124, the ram 108 may move in the Z-direction to allow formation of a successive layer. Since the insertion distance $L_I$ is measured in the Z-direction, movement of the ram 108 to form a successive layer can reduce the insertion distance $L_I$. In an embodiment, the ram 108 can define a maximum insertion distance that is less than the length $L_R$ of the ram 108. For instance, $L_I$ can be no greater than 0.99 $L_R$, such as no greater than 0.95 $L_R$, such as no greater than 0.9 $L_R$, such as no greater than 0.85 $L_R$, such as no greater than 0.8 $L_R$, such as no greater than 0.75 $L_R$, such as no greater than 0.7 $L_R$, such as no greater than 0.65 $L_R$, such as no greater than 0.6 $L_R$, such as no greater than 0.55 $L_R$, such as no greater than 0.5 $L_R$.

FIG. 1 illustrates a manufacturing operation with a portion of a manufactured article 124 already completed. Thus, the actual insertion distance $L_I$ of the ram 108 as depicted is less than the maximum insertion distance.

During manufacturing operations, the manufactured article 124 is formed by generating successive layers. To generate each layer, the ram 108 can be moved in the X-, Y-plane while the beam 106 irradiates the powder 104. Alternatively, the build volume 102 may be moved in the X-, Y-plane alone or in concurrence with movement of the ram 108. After completing a layer, the ram 108, the build volume 102, or both move in the Z-direction and a new layer is formed. Reference to specific planes is made for clarity. It should be understood that the ram 108 or build volume 102 may alternatively be moved in another plane, or planes, during manufacturing operations.

Irradiation beam 106 can scan inside the ram 108 and create raster patterns on the powder surface 112. The selective fusion process can cover the surface cross-section according to part cross-sectional design and by surface hatching. The irradiation beam 106 may be stopped where there is no surface cross-sectional area to be fused according to the part design. In accordance with one or more embodiments, it may be desirable to momentarily pause irradiating operations before starting irradiation of a new layer of the manufactured article 124. Since the irradiation location 112 is disposed within the powder 104 and the ram 108 is actively moving relative to the powder 104 during irradiation, powder 104 may be displaced during manufacturing operations.

Figure 2A:
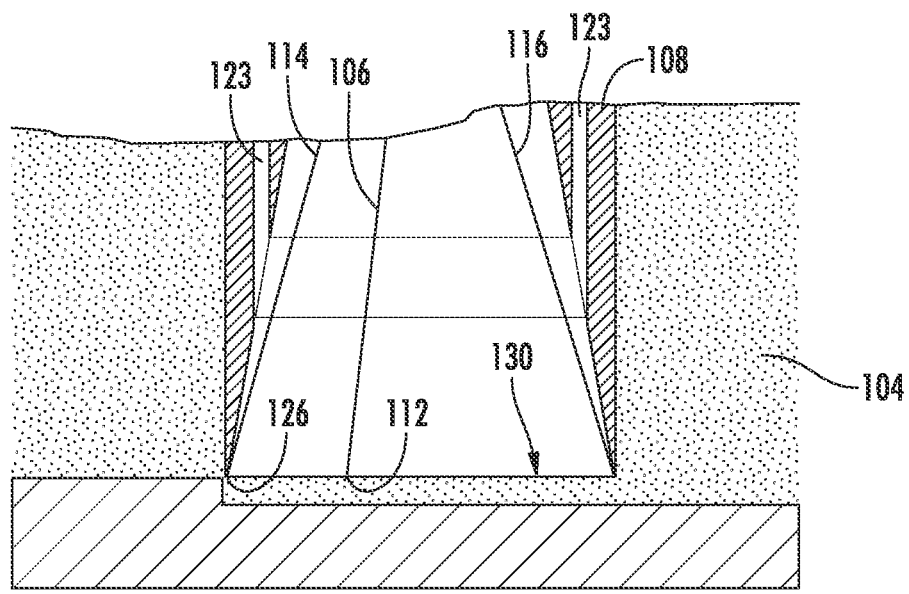
FIG. 2A is an enlarged view of a ram tip of the system in accordance with an exemplary embodiment of the present disclosure as seen without an additively manufactured article disposed below the ram tip.
Figure 2B:
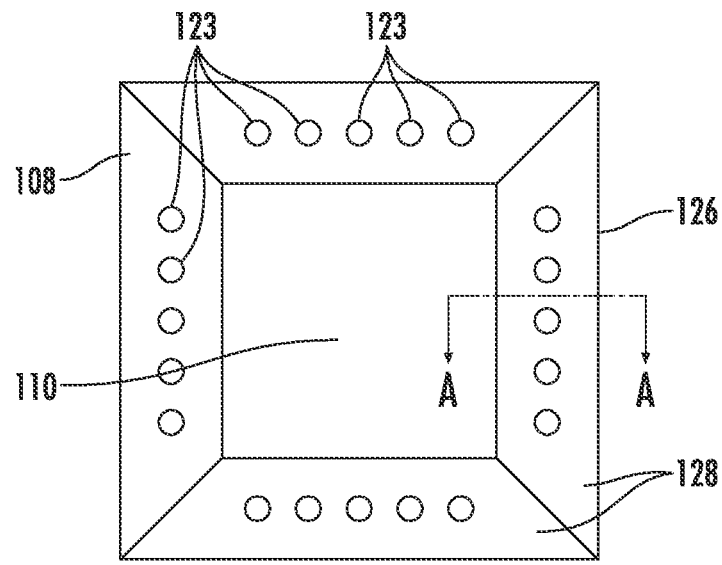
FIG. 2B is an enlarged bottom view of the ram tip in accordance with an exemplary embodiment of the present disclosure.

FIG. 2A illustrates a view of the ram tip 126 at a location within the powder 104 without a formed layer of the manufactured article 124 disposed directly hereafter. That is, the ram tip 126 depicted in FIG. 2 is disposed above unfused (i.e., raw) powder 104. In certain instances, a clearance can be formed between the ram tip 126 and the powder 104. As described in greater detail below, this clearance can be formed using one or more blades 128 (FIG. 2B). As the ram 108 moves laterally within the build volume 102 (i.e., in the X-, Y-plane), the clearance between the ram tip 126 and the powder 104 can be maintained by the blades 128. That is, the blades 128 can bias the powder 104 to create a flat surface 130 against which the beam 106 (FIG. 1) may be irradiated. This flat surface 130 may allow for ideal irradiation of the powder 104.

Formation of the flat surface 130 may require lateral movement of the ram 108. Solely moving the ram 108 in the vertical direction (i.e., in the Z-direction) may not generate a flat surface 130. That is, when the ram 108 is raised relative to the powder 104, the powder 104 may not immediately infill the location below the ram 108. Moreover, any infill of powder 104 which occurs within the clearance during such raising operations may create a localized formation of powder 104 at the edges of the ram tip 126.

In one or more embodiments, the ram 108 can have a cross-sectional profile with a variable shape or dimension. For instance, as depicted in FIG. 2A, the ram 108 can define a tapered edge at the ram tip 126. In certain instances, the tapered edge of the ram 108 can taper from a first dimension, as measured a first distance from the ram tip 126, to a second dimension, as measured at a second distance from the ram tip 126, where the first distance is greater than the second distance and the first dimension is greater than the second dimension. In certain embodiments, the tapered edge can taper to a point at the ram tip 126. Use of a tapered edge may allow the beam 106 to be moved within the ram 108 a greater distance in the X-Y plane. That is, reduction of the sidewall thickness of the ram 108 at the ram tip 126 may allow the beam 106 to operate closer to the edge of the ram 108, thus allowing irradiation to occur at otherwise inaccessible locations, e.g., closer to pre-installed features within the build volume 102.

Figure 2C:
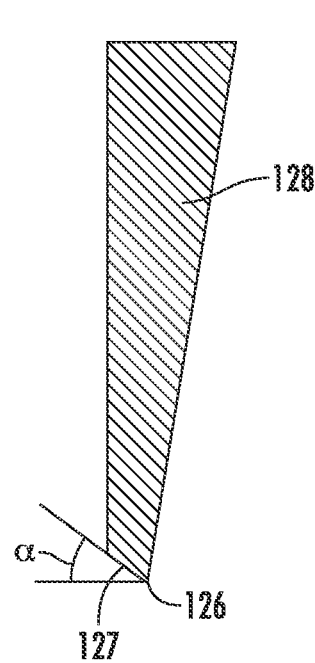
FIG. 2C is a cross-sectional side view of a sidewall of a ram of the system in accordance with an exemplary embodiment of the present disclosure.
Figure 2D:
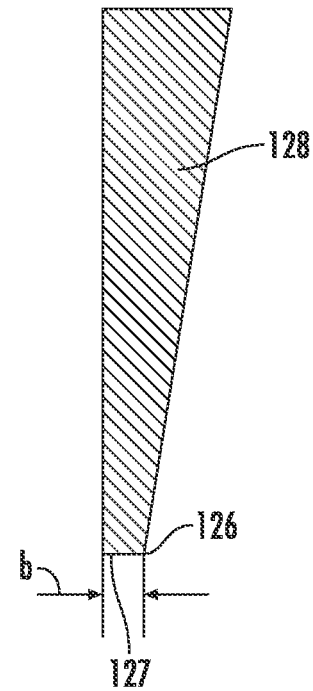
FIG. 2D is a cross-sectional side view of a sidewall of the ram of the system in accordance with another exemplary embodiment of the present disclosure.

Referring still to FIG. 2A, in certain instances the gas passageways 123 may exit the ram 108 within the passageway 110 at a location near the ram tip 126. In this regard, the gas G can be emitted near the ram tip 126 to provide desirable results during irradiation. FIG. 2B illustrates a bottom view of the ram 108 in accordance with an embodiment. The blades 128 depicted in FIG. 2B taper to a sharpened ram tip 126 extending around a perimeter of the passageway 110. The gas passageways 123 include openings which extend through the sidewall of the ram 108 and are configured to pass gas G to an area nearby the irradiation location. FIGS. 2C and 2D illustrate cross-sectional views of the blades 128 in accordance with exemplary embodiments described herein. As illustrated in FIG. 2C, the ram tip 126 can define a surface 127 that is angularly offset from the X-Y plane. The surface 127 can be angularly offset by an angle, $\alpha$, such as at least 1°, such as at least 2°, such as at least 3°, such as at least 4°, such as at least 5°, such as at least 10°, such as at least 15°, such as at least 20°, such as at least 25°. As illustrated in FIG. 2D, in certain instances, the ram tip 126 can define a surface 127 having a flat bottom with a tip width, b, that is at least 0.25 mm, such as at least 0.5 mm, such as at least 0.75 mm, such as at least 1 mm, such as at least 2 mm, such as at least 3 mm, such as at least 4 mm, such as at least 5 mm, such as at least 7.5 mm. Use of the surface 127 having an angular offset or a flat bottom with a tip width can incur different characteristics in the powder 104 while the ram tip 126 is moving therein. For instance, some tip profiles may cause greater or lesser flattening of the powder 104, while other tip profiles may compact the powder 104 to a lesser or greater extent, while yet other tip profiles create surface patterns within the powder 104. Any other number of advantages or designs may be achieved using different ram tips 126.

Figure 3:
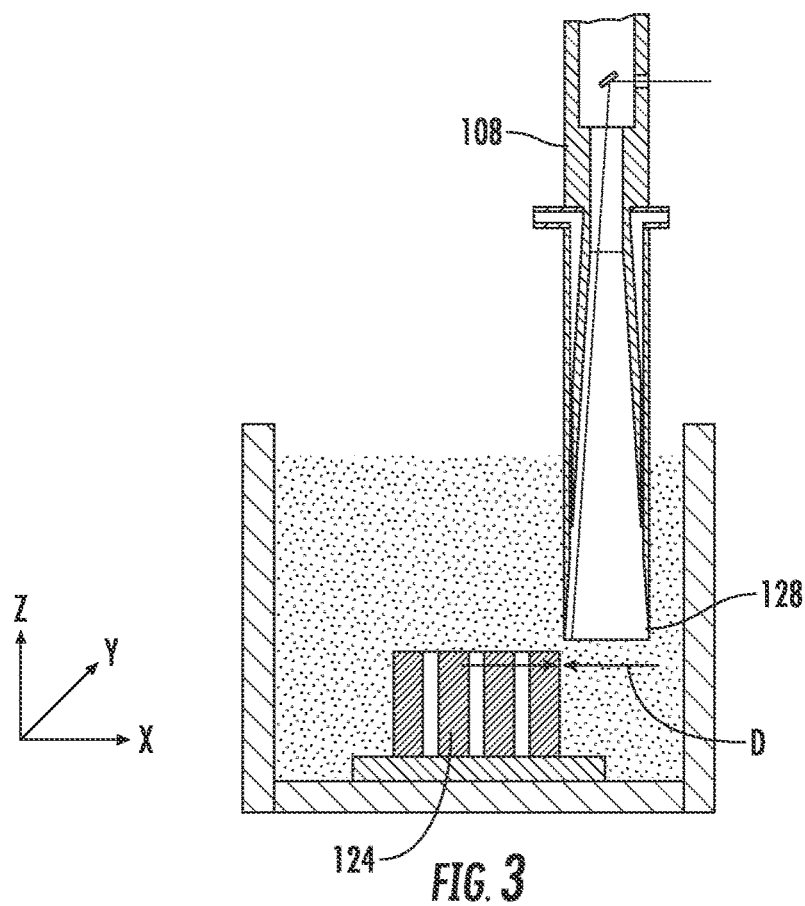
FIG. 3 is a cross-sectional side view of the system for additive manufacturing in accordance with an exemplary embodiment of the present disclosure.

Referring to FIG. 3, in one or more embodiments, the ram 108 can move a distance, D, as measured in the X-, Y-plane, beyond the manufactured article 124 after completing each layer of the manufactured article 124 and prior to beginning a next, successive layer. The distance D may be measured by a distance between a closest portion of the ram 108 and the manufactured article 124 in the X-, Y-plane. In some embodiments, the distance D can be approximately 0 mm. That is, the ram 108 can move laterally just far enough to clear the underlying manufactured article 124 without forming a gap between the ram 108 and the manufactured article 124, as measured in the X-, Y-plane. In this position, powder 104 may backfill behind the ram 108 such that when the ram 108 reverses direction a sufficient amount of powder 104 is ready to be scraped by the blades 128 to form the clearance CL. In other embodiments, the distance D can be less than 0 mm, such as for example, less than −1 mm, such as less than −2 mm, such as less than −3 mm, such as less than −4 mm. In these embodiments, the ram 108 may not need to fully clear the underlying manufactured article 124 in the X-, Y-plane before being raised in the Z-direction and forming a new layer. Instead, the ram 108 may still be partially above the manufactured article 124. That is, in certain circumstances, the blade 128 may provide the flat surface 130 even without the ram 108 fully laterally clearing the manufactured article 124. In yet other embodiments, the distance D can be at least 1 mm, such as at least 2 mm, such as at least 3 mm, such as at least 4 mm, such as at least 5 mm, such as at least 10 mm. In some instances, the system 100 may be reconfigurable between different distances D.

During lateral movement between layers, the beam 106 may be temporarily stopped when ram 108 translates to the next surface feature after completing the current one in the same layer. The beam 106 may alternatively be paused during this movement so that irradiation of the powder 104 does not occur where there is no surface cross-section to be irradiated and fused. In certain instances, irradiation can continue surface hatching by high frequency oscillatory scanning.

Figure 4:
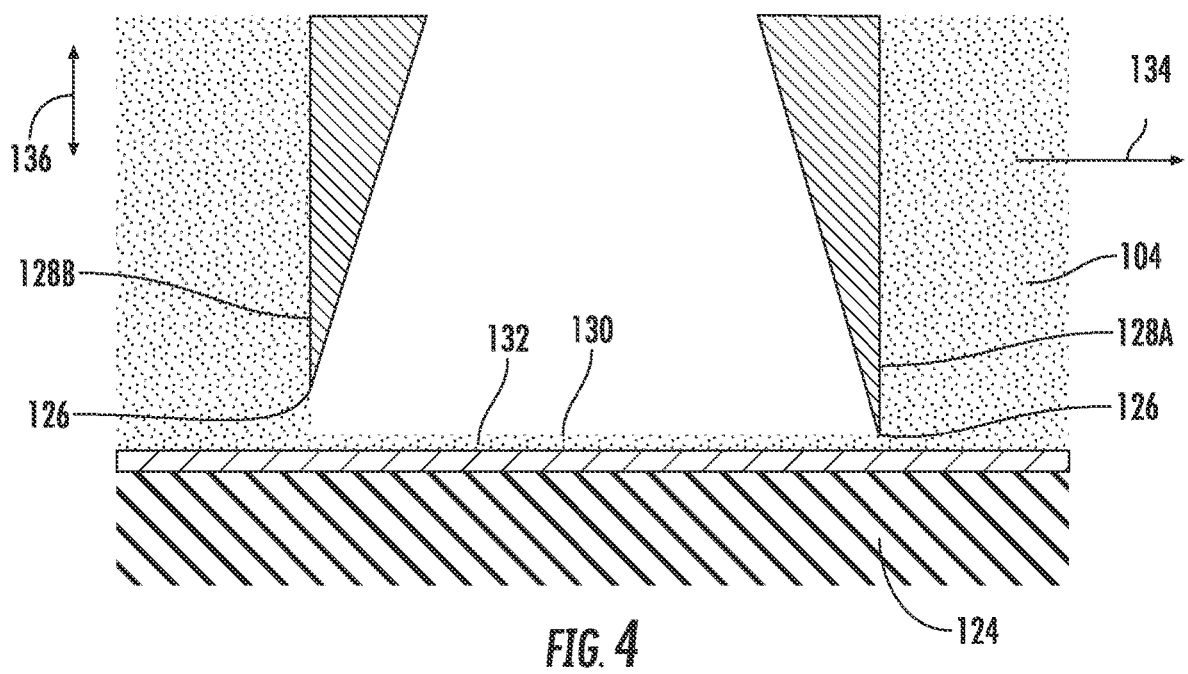
FIG. 4 is an enlarged view of the ram tip in accordance with an exemplary embodiment of the present disclosure as seen with an additively manufactured article disposed below the ram tip.

FIG. 4 illustrates a cross-sectional view of the ram tip 126 at a location within the powder 104 with a layer of the manufactured article 124 disposed below the ram tip 126. In the view depicted in FIG. 4, the beam 106 (FIG. 1) is not actively irradiating the powder 104. When the ram 108 is moved, a layer 132 of powder 104 can form below the ram tip 126 and above the manufactured article 124. The layer 132 of powder 104 has a flat surface 130. As described above, the layer 132 and the flat surface 130 can be formed by one of the blades 128. In particular, as the ram 108 moves in a direction 134 through the powder 104, a leading side blade 128A can create the layer 132 having the flat surface 130. Meanwhile, a trailing side blade 128B may be raised to prevent contact with the flat surface 130. Alternatively, the trailing side blade 128B may remain in a lowered position (e.g., similar to the leading side blade 128A).

In one or more embodiments, the blade 128A and 128B may be independently controlled. For example, the blades 128A and 128B may be independently controlled by motors which raise and lower the blades 128A or 128B in a direction corresponding with the arrowed line 136. In certain instances, the leading side blade 128A may be disposed at a lower position as compared to the trailing side blade 128B. In this regard, the leading side blade 128A can form the flat surface 130, and the trailing side blade 128B can be clear of the flat surface 130 so as to not interfere therewith. As the ram 108 changes direction in the powder 104, the previously trailing side blade 128B may become the leading side blade 128A and the previously leading side blade 128A may become the trailing side blade 128B. It should be noted that while FIG. 4 only illustrates two blades 128, the ram 108 may include three or more blades 128, such as four or more blades 128, such as five or more blades 128, or so on. The blades 128 may each be independently or concurrently controllable in any combination so as to effect formation of a flat surface 130.

Figure 5:
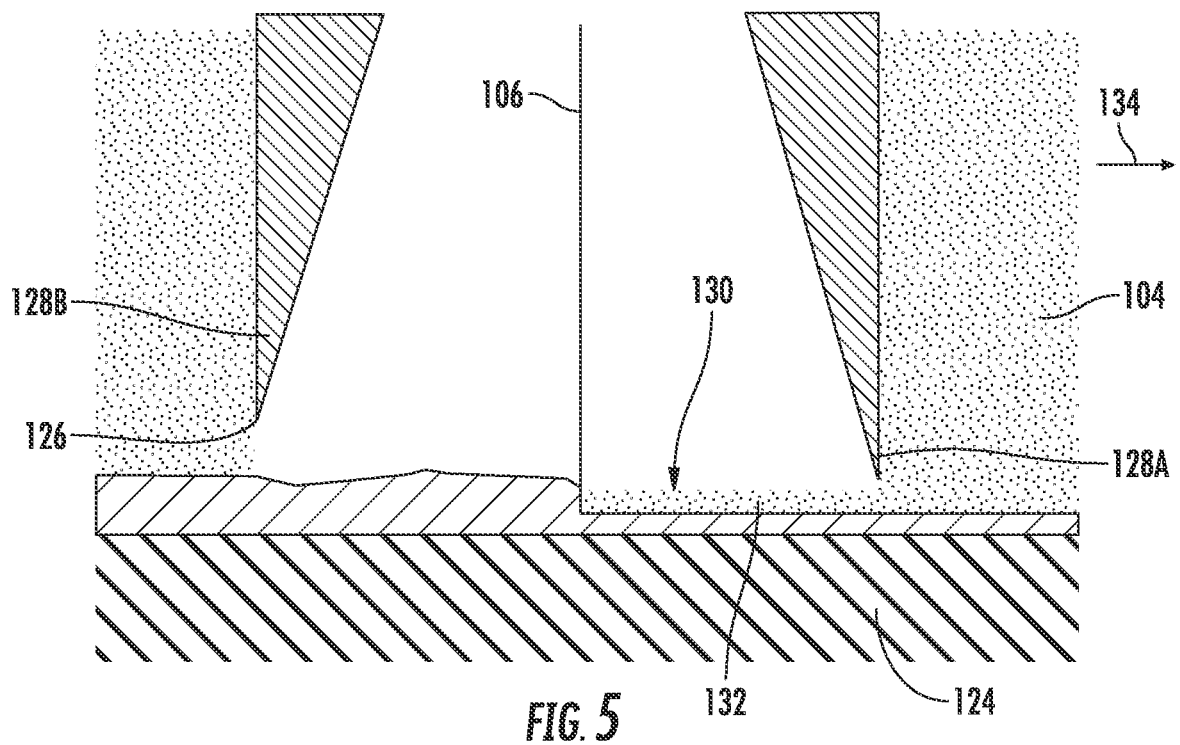
FIG. 5 is an enlarged view of the ram tip in accordance with an exemplary embodiment of the present disclosure as seen with the additively manufactured article disposed below the ram tip and while the system is irradiating a layer of powder disposed between the ram tip and the additively manufactured article.

FIG. 5 illustrates a view of the ram tip 126 as seen in FIG. 4, with the ram 108 moving in the direction 134 and the beam 106 actively irradiating the layer 132 of powder 104 disposed under the ram tip 126. As depicted, the beam 106 interacts with the powder 104 at the irradiation location 112. In front of the irradiation location, the powder 104 is fused in a layer 132 having a flat surface 130. As described above, the layer 132 is formed by the leading side blade 128A. Behind the irradiation location 112, the powder 104 is irradiated, fused, and solidified to a layer of the manufactured article 124.

The recently irradiated powder (i.e., the powder 104 immediately behind the irradiation location 112) may undergo changes while the ram 108 moves thereover. For instance, the recently irradiated powder may be actively undergoing cooling, solidification, or even phase change while the ram 108 moves thereover. After the ram 108 clears the recently irradiated powder, the non-irradiated powder 104 behind the ram 108 may cover over the irradiated (i.e., fused) powder.

In one or more embodiments, the recently irradiated powder may not have a flat surface. For instance, the recently irradiated powder may have an undulating surface, a rough surface, or the like driven by surface tension and gravity. This can be the result of the irradiation process itself. As such, it may be desirable to maintain the trailing side blade 128B in an at least partially retracted position as illustrated to ensure the ram tip 126 does not drag against the irradiated powder. It is noted that the surface profile or texture of the recently irradiated powder may assist adhesion with the successively formed layers of the manufactured article 124.

Figure 6:
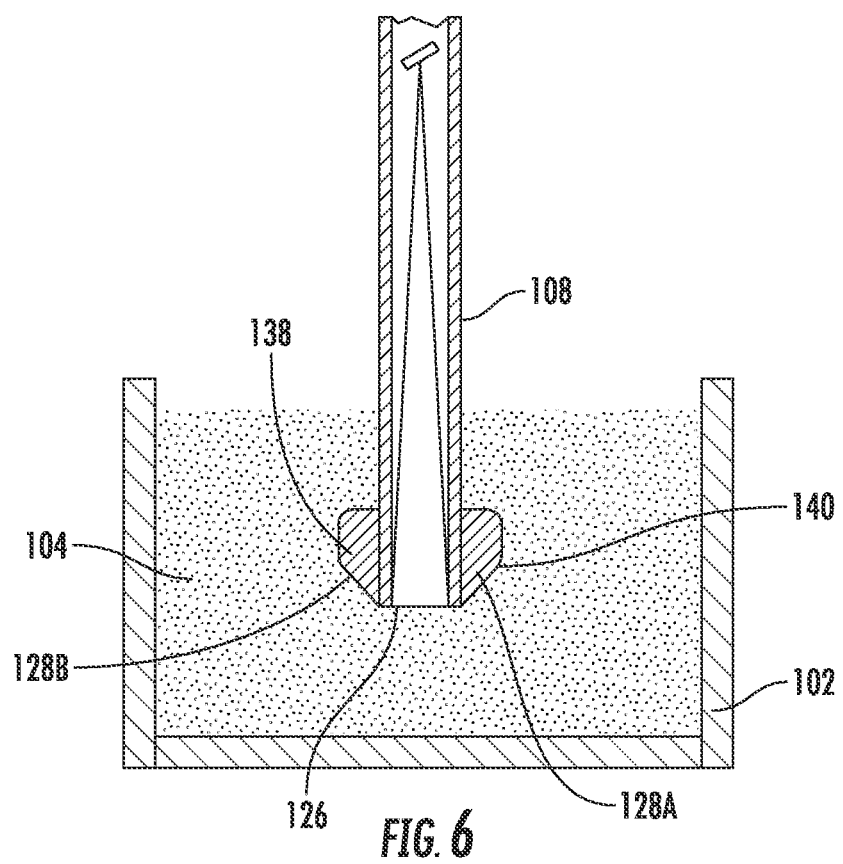
FIG. 6 is a cross-sectional side view of the system with a ram having a guide to effect powder in accordance with an exemplary embodiment of the present disclosure.
Figure 7:
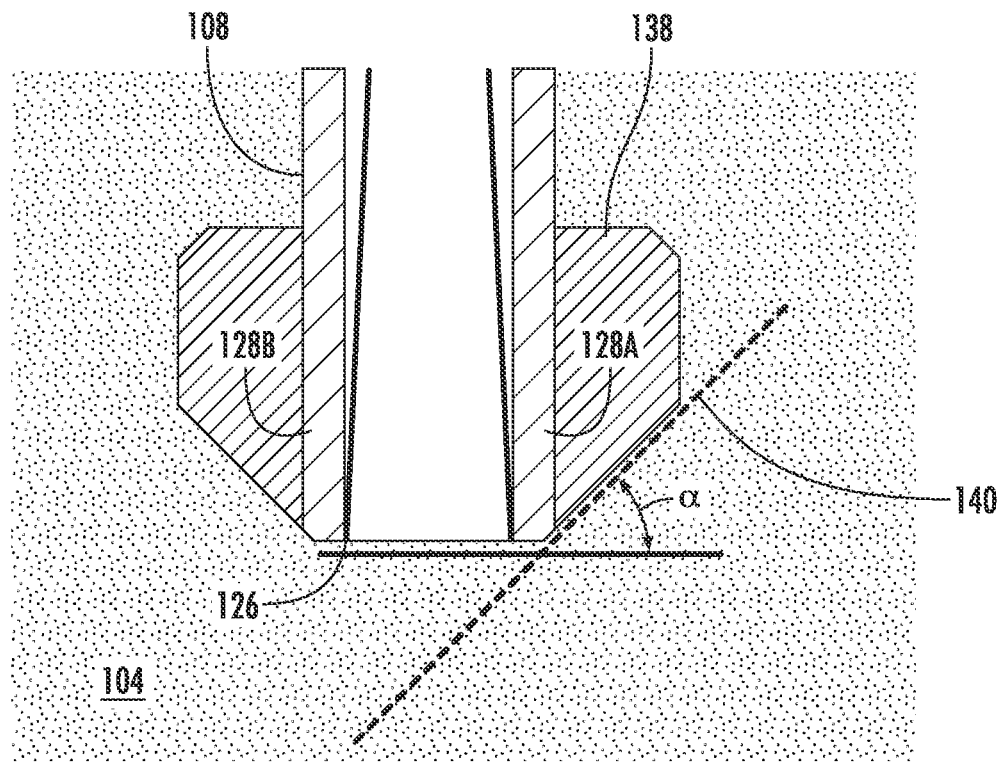
FIG. 7 is an enlarged view of the guide of the ram illustrated in FIG. 6 in accordance with an exemplary embodiment of the present disclosure.

In some instances, it may be desirable to affect the powder 104 while the ram 108 moves. Referring to FIGS. 6 and 7, in one or more embodiments, the ram 108 can include a guide 138 configured to affect the powder 104. The guide 138 can include, for example, a ramped surface 140. As the ram 108 moves within the build volume 102, the guide 138 can affect the powder 104, at least where the layer 132 is formed beneath the ram tip 126. For instance, the ramped surface 140 can apply a compression force against the powder 104 which can, for example, compact the powder 104 so as to increase the density of the layer 132 (FIGS. 4 and 5). Higher density powder 104 may, in turn, increase strength of the manufactured article 124 with reduced porosity (FIGS. 4 and 5).

In an embodiment, the ramped surface 140 can form a cross-sectional shape rotationally symmetrical about the entire circumference of the ram 108. That is, the ramped surface 140 can form a continuously ramped surface that extends around the ram 108. In other embodiments, the guide 138 can include separate components (e.g., a first component, a second component, a third component, etc.) which are all independent of one another. For instance, the first component of the guide 138 can be part of the leading side blade 128A and the second component of the guide 138 can be part of the trailing side blade 128B. In this regard, the first and second components of the guide 138 can be independently controlled by controlling the blades 128.

Referring to FIG. 7, the ramped surface 140 can generally lie along a line (or a best fit line) that is angularly offset from the X-, Y-plane. In an embodiment, the angle of offset, $\alpha$, between the line and the X-, Y-plane can be at least 1°, such as at least 2°, such as at least 3°, such as at least 4°, such as at least 5°, such as at least 10°, such as at least 20°, such as at least 30°, such as at least 40°. In an embodiment, the angle of offset can be approximately 45°.

In the depicted embodiment, the ramped surface 140 is linear. In another embodiment, the ramped surface 140 can be arcuate. For instance, the ramped surface can define a tapered profile. The tapered profile can be cylindrical, concave, or convex. In yet another embodiment, the ramped surface 140 can define a stepped surface including, e.g., a plurality of stepped surfaces which guide the powder 104. In yet another embodiment, the ramped surface 140 can include different contours at different locations. Yet further designs and shapes of the ramped surface 140 are contemplated herein.

Figure 8:
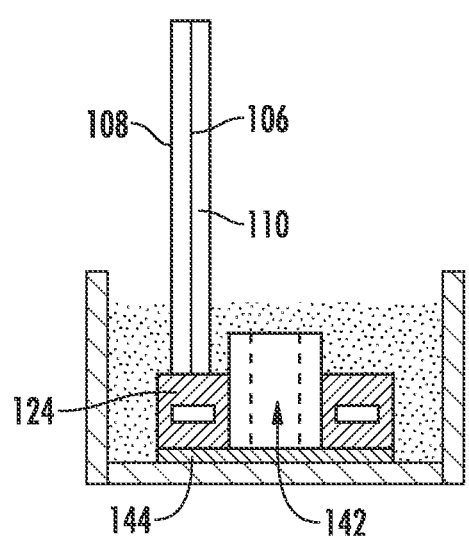
FIG. 8 is a cross-sectional side view of the system including a pre-installed feature disposed within a build volume of the system in accordance with an exemplary embodiment of the present disclosure.
Figure 9:
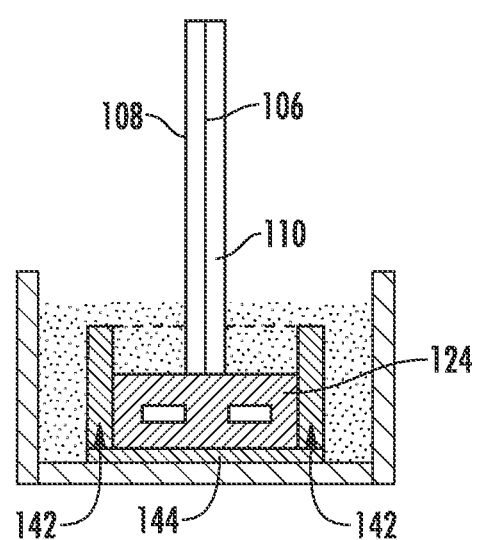
FIG. 9 is a cross-sectional side view of the system including a pre-installed feature disposed within a build volume of the system in accordance with an exemplary embodiment of the present disclosure.

FIGS. 8 and 9 illustrate embodiments of the system 100 with one or more pre-installed features 142 disposed within the build volume 102 during a manufacturing operation. The one or more pre-installed features 142 may be installed within the powder 104 prior to irradiating the powder 104 with the beam 106 or during a period of cessation when the beam 106 is not actively irradiating the powder 104. In certain instances, at least one of the pre-installed components 142 can be disposed at an internal location within the manufactured article 124. That is, the pre-installed components 142 may form an at least partially internal portion of the manufactured article 124. In other instances, at least one of the pre-installed components 142 can be disposed at an external location relative to the manufactured article 124. That is, the pre-installed feature 142 may form an at least partially external portion of the manufactured article 124.

As depicted in FIGS. 8 and 9, the pre-installed component(s) 142 may be disposed on build plates 144 contained within the build volume 102. The ram 108 can move relative to the build volume 102 without hitting the pre-installed component(s) 142. As described above, the beam 106 may be redirected relative to the passageway 110 such that when the ram 108 is disposed at locations adjacent to the pre-installed feature(s) 142, the beam 106 can be located or scanned more proximate to the pre-installed component(s) 142 than a central region of the passageway 110. The beam scanning can be directly driven by mirror rotation. A sharp blade edge can also permit close beam irradiation to the side surface of the pre-installed component. In certain instances, movement of the ram 108 within the powder 104 can occur simultaneously with movement of the beam 106 within the passageway 110. In other instances, the ram 108 and beam 106 can be moved at different times. For instance, the ram 108 may first translate through the powder 104 a fixed distance with the front edge contacting the side of pre-installed component. Upon the ram 108 translating the fixed distance and contacting the pre-installed component, the beam 106 may scan the flat powder surface within the passageway 110 while the ram 108 remains relatively static.

In certain instances, the placement of pre-installed component(s) 142 within the build volume 102 can reduce powder consumption by occupying volume of the manufactured article 124, which can result in shorter build times. In other instances, the placement of pre-installed feature(s) 142 within the build volume 102 can reduce or even eliminate dependence on a build plate 144. That is, for example, the manufactured article 124 can be coupled to the pre-installed feature(s) 142 and not directly coupled to the base plate 144. In yet other instances, the placement of pre-installed component(s) 142 within the build volume 102 can allow for high precision or high-quality components to be introduced to the manufactured article 124. That is, the pre-installed component(s) 142 may exhibit higher precision or high quality as compared to the precision or quality attainable by the system 100. In yet other instances, the placement of pre-installed component(s) 142 within the build volume 102 can allow for different material(s) to be introduced to the manufacturing article 124. That is, the different material(s) may locally exhibit better properties than the fused powder during the function of complete manufacturing article 124.

Figure 10:
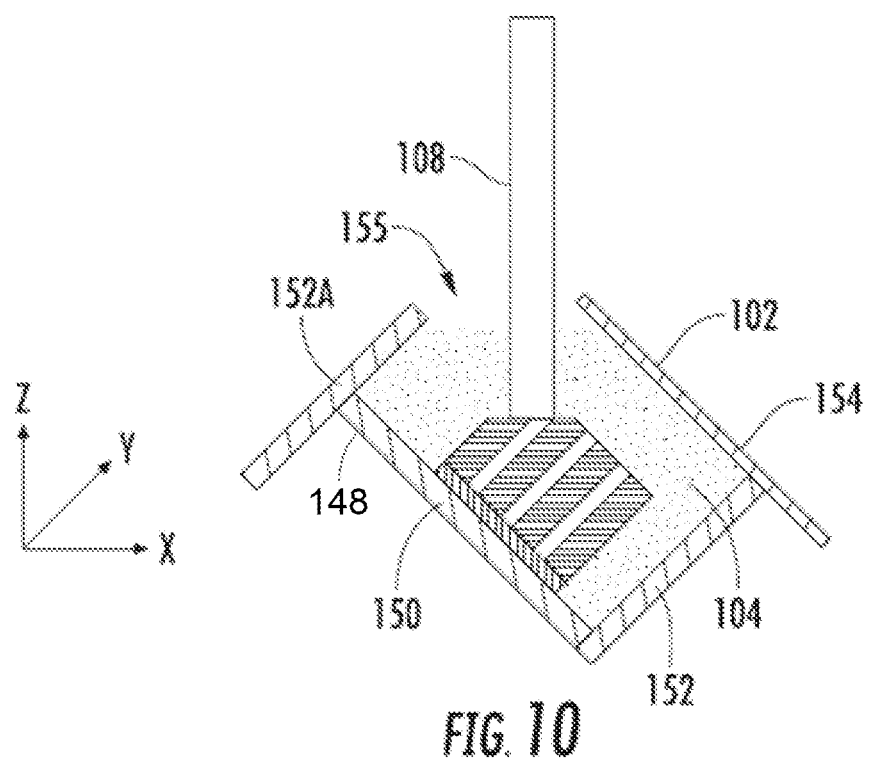
FIG. 10 is a cross-sectional side view of the system including a rotatable build volume in accordance with an exemplary embodiment of the present disclosure.
Figure 11:
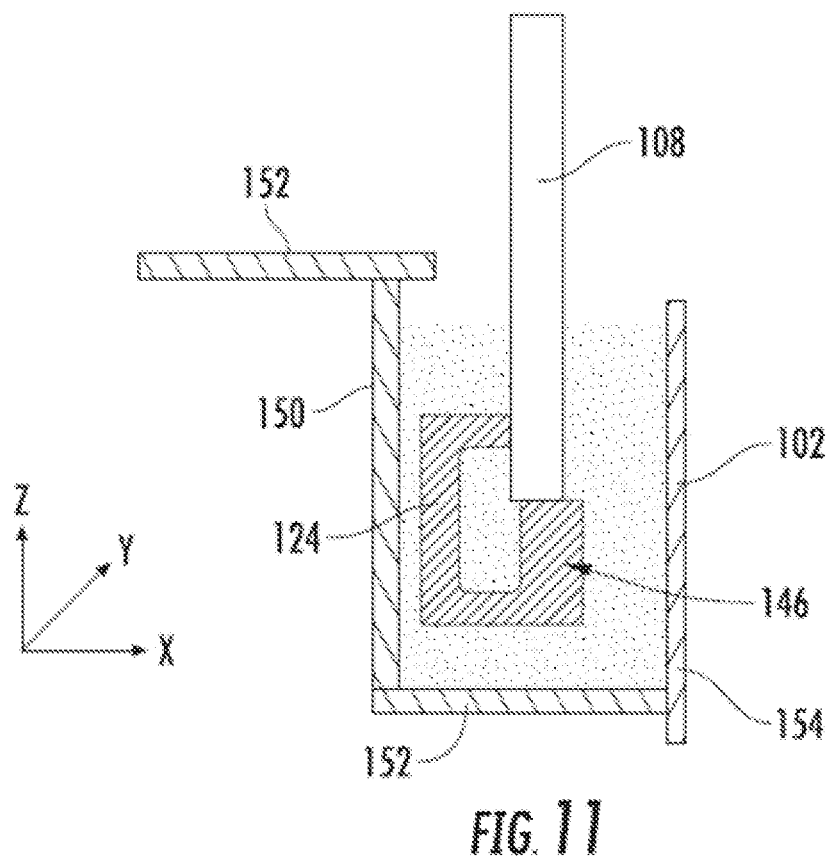
FIG. 11 is a cross-sectional side view of the system including a rotatable build volume in accordance with an exemplary embodiment of the present disclosure.

As previously described, in certain instances, the build volume 102 may be moveable. For instance, in an embodiment, the build volume 102 may be rotatable about at least one rotation axis. For instance, as depicted in FIG. 10, the build volume 102 may be rotatable about the Y-axis. In an embodiment, the build volume 102 can rotate while the ram 108 moves through the powder 104. Simultaneous movement of the build volume 102 and ram 108 may enable the system 100 to manufacture complex geometries or to even achieve a more suitable surface finish on the manufactured article. In another embodiment, the build volume 102 may only be capable of rotating while the ram 108 is not moving (or at least not actively irradiating the powder 104). In this regard, movement of the build volume 102 may permit construction of certain features that might not otherwise be achievable. For example, FIG. 11 illustrates a manufactured article 124 having an overhang surface 146. In laser powder bed fusion of metallic materials, horizontal overhang surfaces suffer from poor print quality and may typically require use of support structure. By rotating the build volume 102 by approximately 90°, the ram 108 can form the overhang surface 146 at a more suitable vertical orientation whereby the horizontal overhang end 146 is supported by underlying portions of the manufactured article 124. Thus, rotation of the build volume 102 may facilitate the creation of more complex and difficult geometries than otherwise achievable.

Referring again to FIG. 10, the build volume 102 can generally include a body 148 configured to retain the powder 104 therein. In an embodiment, the body 148 can include a base 150 and a plurality of sidewalls 152 extending from the base 150. The plurality of sidewalls 152 can include, for example, at least three sidewalls 152, such as at least four sidewalls 152, such as at least five sidewalls 152, or the like. In an embodiment, at least one of the plurality of sidewalls 152 is moveable relative to the base 150. For instance, as illustrated in FIG. 10, a first sidewall 152A of the body 148 is displaceable relative to the base 150. The body 148 can further include a cover 154. The sidewalls 152 can extend between the base 150 and the cover 154, and the cover 154 may move relative to the sidewalls 152. In this regard, the sidewalls 152 and cover 154 may allow for rotation of the body 148 while maintaining a passage 155 of access for the ram 108 and retaining the powder 104. In operation, the powder 104 driven by gravity and enabled by flowability may move within the build volume 102 during rotation of the build volume 102. In certain instances, the ram 108 may be moved a distance after completion of the rotation and prior to reinitiating irradiation to ensure sufficient powder 104 is disposed at the irradiation location 112 (FIG. 1).

Whereas the build volume 102 in FIG. 10 is depicted as having a rotation of approximately 45°, the build volume 102 in FIG. 11 is depicted as having been rotated approximately another 45°. In this regard, the sidewalls 152 effectively become the cover and base, and the base 150 and cover 154 effectively become the sidewalls. In an embodiment, the build volume 102 can rotate at least 45° in either direction.

FIGS. 12 to 16 illustrate steps associated with use of a cover 156, which can be selectively implemented to cover the ram tip 126 when, e.g., moving the ram 108 in a direction into the powder 104. Use of the cover 156 can prevent powder 104 from building up in the ram tip 126, e.g., pushing the ram 108 into the powder 104 without the cover 156 can cause the volume of the ram inside to be occupied by powder 104. This can disable the function of the system 100. For instance, the ram 108 may become stuck on the irradiated powder such that the blades 128 are prevented from scraping and leveling a flat powder surface to be irradiated. Use of the cover 156 can maintain the clearance of the ram inside.

Figure 12:
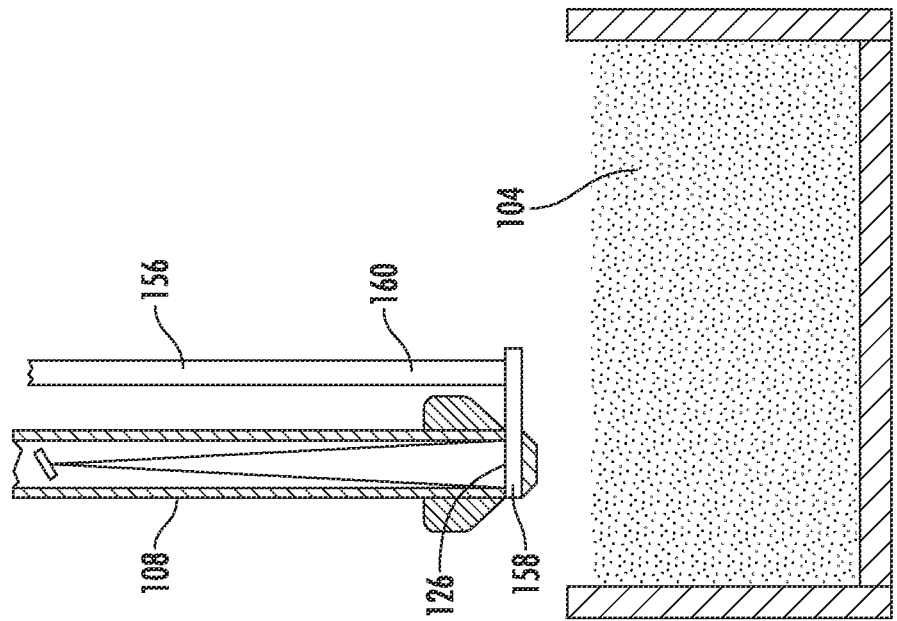
FIG. 12 is a cross-sectional side view of the system in accordance with an exemplary embodiment of the present disclosure where the ram tip is covered by a cover and the ram is not inserted into the powder.

FIG. 12 depicts the cover 156 in the closed position prior to inserting the ram 108 into the powder 104. The cover 156 may be selectively removable from the ram tip 126. In accordance with an exemplary embodiment, the cover 156 may include a cover portion 158 which covers the ram tip 126 and a rod 160 extending from the cover portion 158 to a location spaced apart from the ram tip 126. The rod 160 may allow for actuation of the cover portion 158 to move the cover portion 158 from the ram tip 126. In other exemplary embodiments, the cover portion 158 may be coupled to the ram 108 such that the cover portion 158 remains coupled with the ram 108 even after being cleared from the ram tip 126. Other designs are contemplated herein without departing from the scope of the disclosure.

Figure 13:
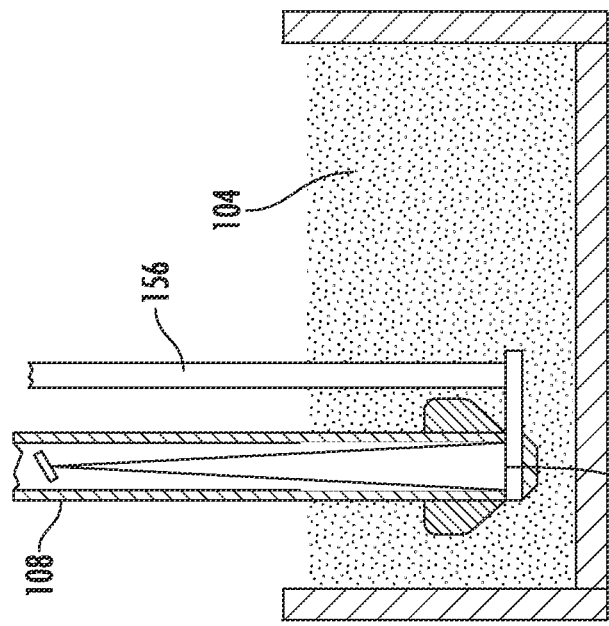
FIG. 13 is a cross-sectional side view of the system in accordance with an exemplary embodiment of the present disclosure where the ram tip is inserted into the powder.
Figure 14:
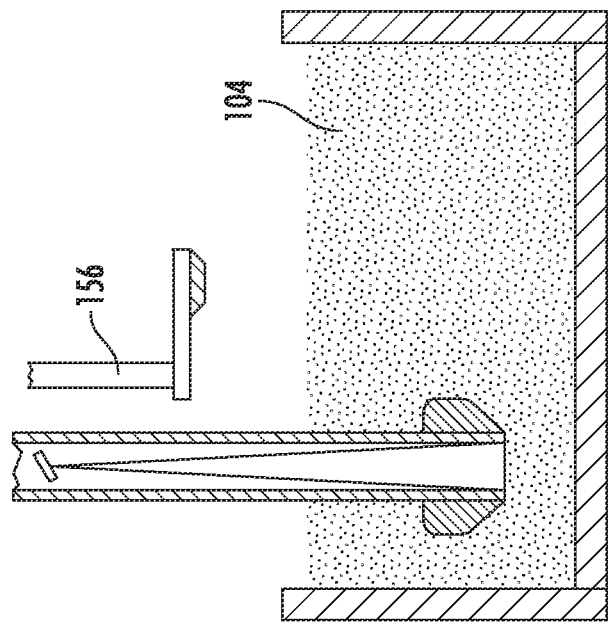
FIG. 14 is a cross-sectional side view of the system in accordance with an exemplary embodiment of the present disclosure where the cover is displaced from the ram tip.
Figure 15:
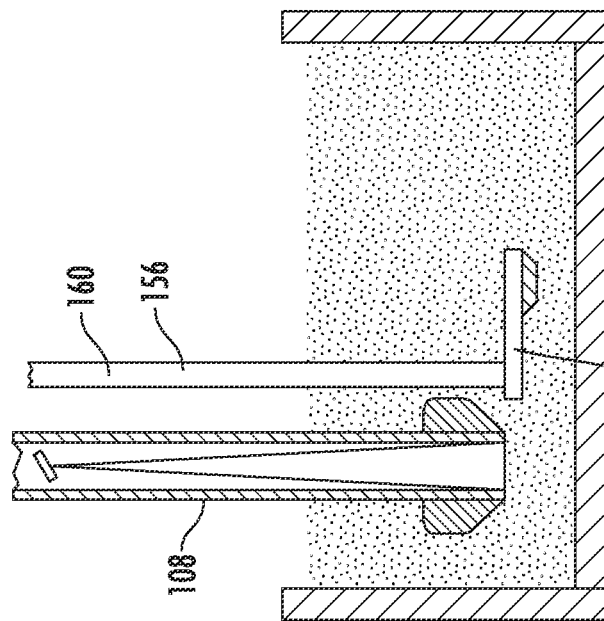
FIG. 15 is a cross-sectional side view of the system in accordance with an exemplary embodiment of the present disclosure where the cover is removed from the powder.
Figure 16:
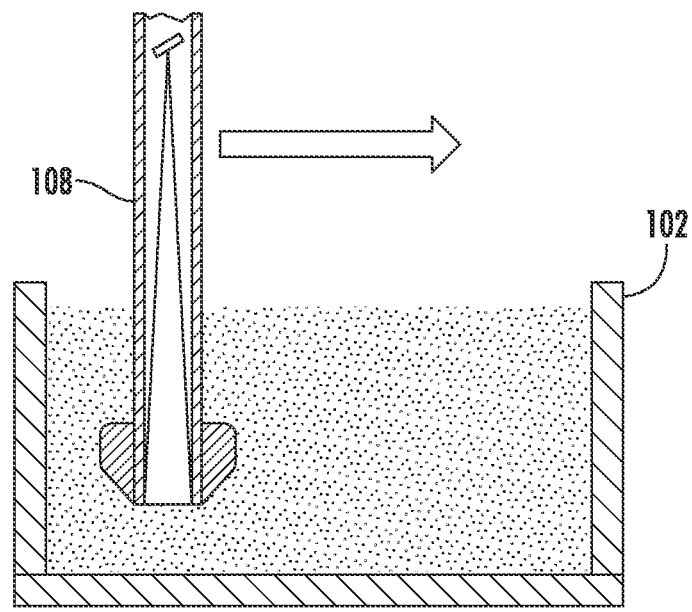
FIG. 16 is a cross-sectional side view of the system in accordance with an exemplary embodiment of the present disclosure where the ram is moved through the powder to perform an additive manufacturing process.

FIG. 13 depicts the ram 108 being inserted into the powder 104 with the cover 156 selectively retained over the ram tip 126. In an embodiment, the cover 156 remains retained over the ram tip 126 until the ram 108 reaches a lowest position in the build powder 104 required for the manufactured article to be made. After reaching the lowest position in the build powder 104, the cover 156 is disengaged from the ram tip 126. As illustrated in FIG. 14, the cover 156 is swinged from the closed position to the open position by rotating about a rotation axis parallel with the Z-axis. More particularly, the rod 160 may be rotated until the cover portion 158 clears the ram 108. Referring to FIG. 15, the cover 156 may then be removed from the powder 104. In particular, the cover 156 may be translated from the powder 104. With the cover 156 removed, the manufacturing operation can commence (or resume) with the ram moving across the build volume 102, as depicted in FIG. 16.

FIGS. 17 to 20 illustrate steps associated with the use of a door 153 which can be selectively used to open and close the build volume 102. When closed, the door 153 can prevent powder 104 from exiting the build volume 102. When at least partially opened, an opening can form where the door 153 was previously disposed to permit the ram 108 to enter into the build volume 102. In certain instances, the door 153 can be sized or shaped to allow the ram 108 to move into and out of the build volume 102 without powder 104 exiting the build volume 102. For instance, the door 153 can have the same size and shape as a portion of the ram 108 passing therethrough. In this regard, the ram 108 can effectively block the powder 104 from exiting the build volume 102 when the door 153 is open.

Figure 17:
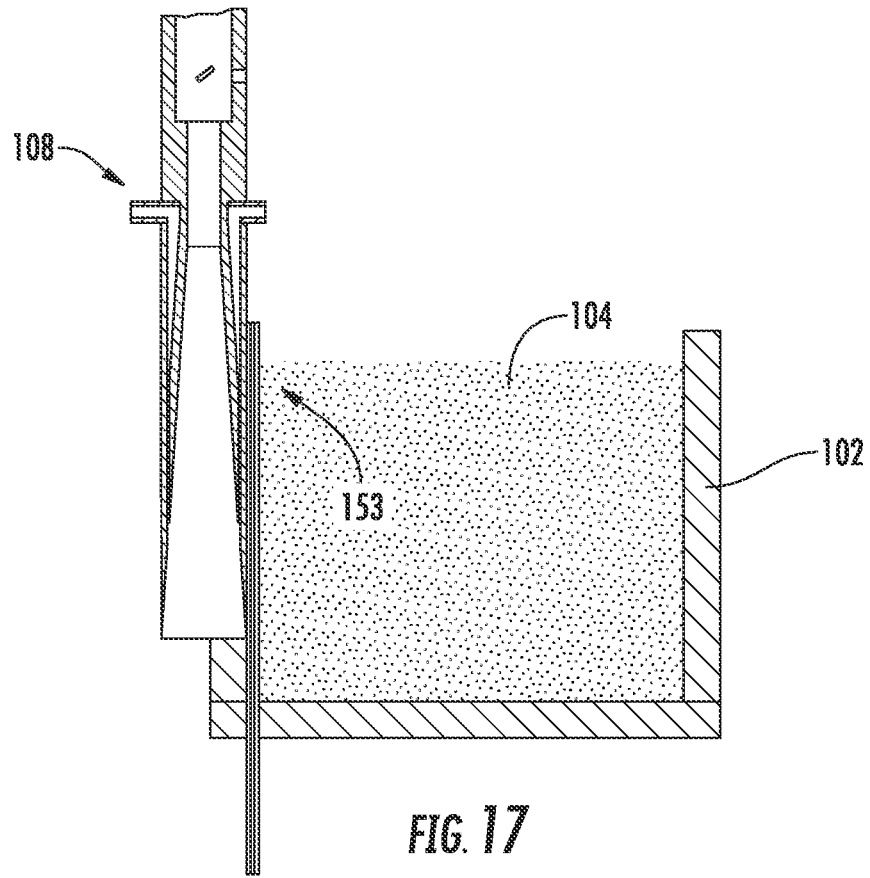
FIG. 17 is a cross-sectional side view of the system in accordance with another exemplary embodiment of the present disclosure where the ram is outside the build volume and a door is closing the build volume to prevent egress of powder therefrom.
Figure 18:
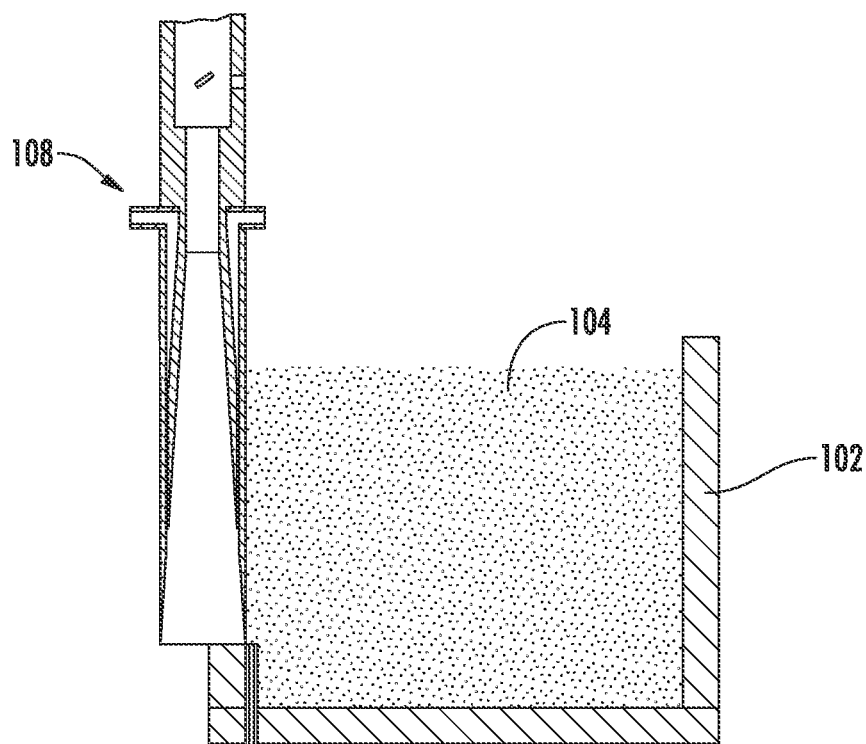
FIG. 18 is a cross-sectional side view of the system in accordance with the other exemplary embodiment of the present disclosure where the ram is outside the build volume and the door is open to allow the ram to move into the build volume.

FIG. 17 depicts the ram 108 at an external location of the door 153, proximate therewith. In certain instances, the ram 108 may be brought into contact, or near contact, with the door 153 at the step associated with FIG. 17. FIG. 18 depicts the door 153 in the open position. In this position, the ram effectively forms a blocking surface to prevent powder 104 from escaping the build volume 102. With the door 153 in the open position, the ram 108 can be translated into the build volume 102. It is noted that the door 153 is not required to move between the completely open and completely closed positions. When introducing the ram 108 into the build volume 102, it may be desirable to translate the ram 108 in only the X-Y plane to prevent ingress of powder 104 into the ram 108. That is, moving the ram 108 in the Z-direction may be undesirable, particularly when translated in the Z-direction downward into the powder 104 as this motion may cause powder 104 to enter the ram 108 and hinder the irradiation process. In this regard, the ram 108 may be translated into the build volume 102 at the vertical elevation (i.e., in the Z-direction) where an initial irradiation step is to be performed. Accordingly, it may be desirable to open the door 153 only partially in view, e.g., of the current layer height to be processed when the ram 108 is introduced to the build volume 102.

Figure 19:
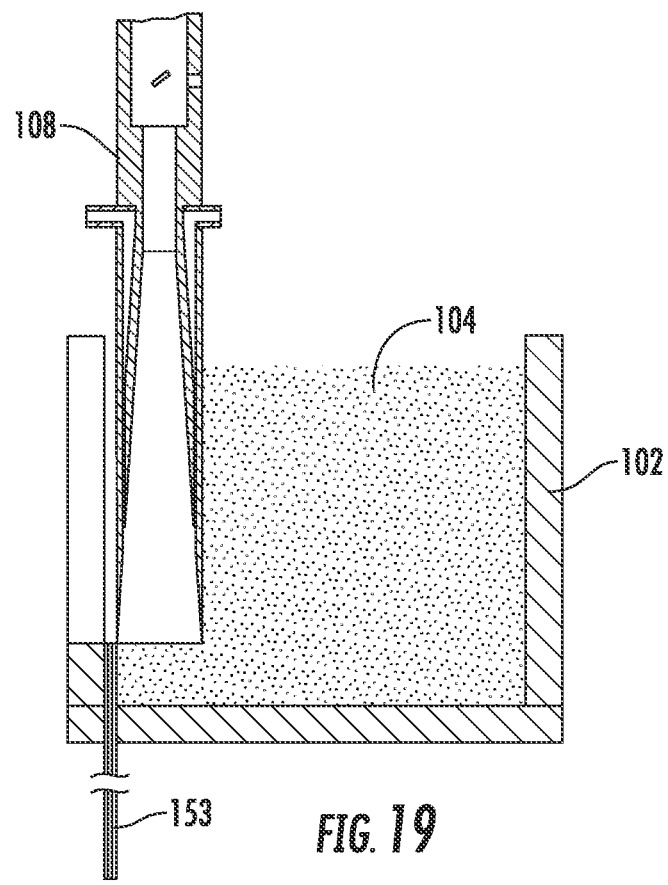
FIG. 19 is a cross-sectional side view of the system in accordance with the other exemplary embodiment of the present disclosure where the ram is inside the build volume and the door is in the open position.
Figure 20:
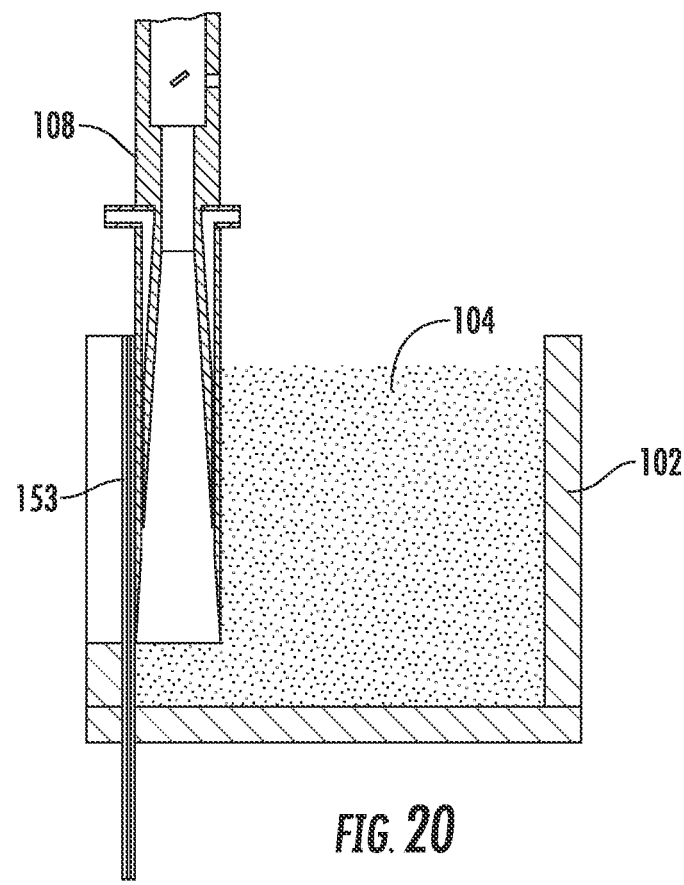
FIG. 20 is a cross-sectional side view of the system in accordance with the other exemplary embodiment of the present disclosure where the ram is inside the build volume and the door is in the open position.

FIG. 19 depicts the ram 108 being moved into the build volume 102 past the door 153. As shown, the ram 108 may move into the build volume 102 and stop after clearing the door 153, but prior to forming a gap relative therewith. In this regard, the ram 108 can effectively block powder egress and maintain a seal with the build volume 102 similar to the door 153. FIG. 20 depicts a view of the build volume 102 with the door 153 in the closed position. At this point, the ram 108 can move within the build volume 102 as described in previous embodiments so as to irradiate the powder 104 and selectively form an article in the build volume 102.

It should be understood that while the door 153 in FIGS. 17 to 20 is illustrated opening and closing through movement in the Z-direction, in one or more non-illustrated embodiments, the door 153 can translate in any combination of the X-direction, the Y-direction, and the Z-direction, pivot along a pivot axis disposed in any combination of the X-direction, the Y-direction, and the Z-direction, or both translate and pivot in any combination of the X-direction, the Y-direction, and the Z-direction. In certain instances, the door 153 may have sealing features, such as brushes, screens, rubber skirts, or the like which assist in sealing the door 153 or preventing egress of powder 104 from the build volume 102, e.g., when the door 153 is moving or in the open position.

Figure 21:
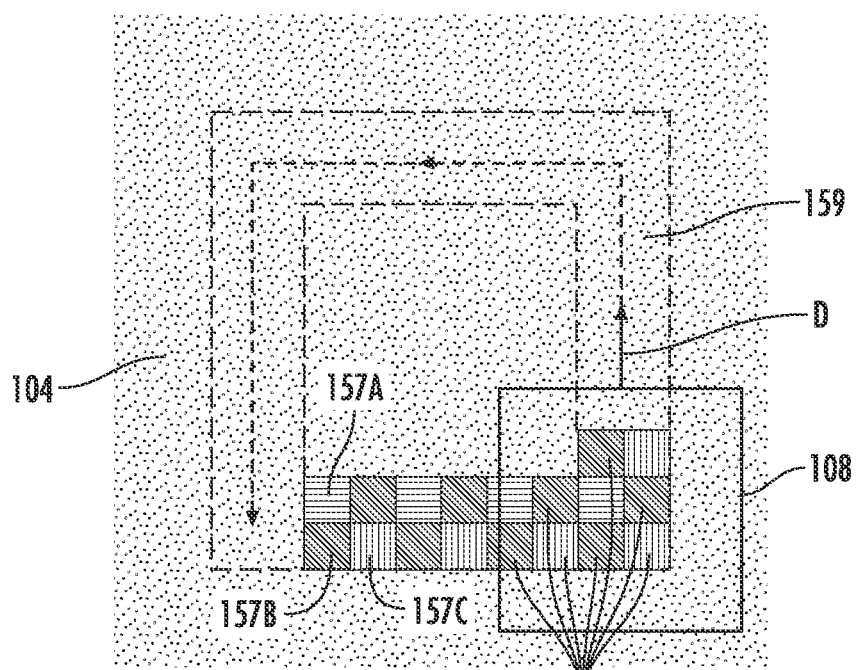
FIG. 21 is a top view of a partially formed layer of powder within the build volume during irradiation, in accordance with an exemplary embodiment of the present disclosure.

FIG. 21 depicts an exemplary view of a partially formed layer of powder 104 within the build volume during irradiation. As depicted, the ram 108 can move within the powder 104 in a direction D along a path 159. The path 159 can include straight segments, arcuate segments, or both. As the ram 108 moves, the aforementioned beam can selectively irradiate the powder 104 to form a manufactured article within the powder 104 one layer at a time.

In certain instances, the ram 108 can be in constant motion, or generally constant motion, during the irradiation process. That is, the ram 108 may move while irradiation is simultaneously occurring. In other instances, the ram 108 may pause at certain locations for a duration of time while irradiation occurs. As previously described, the beam 106 (FIG. 1) can move within the passageway 110 (FIG. 1) of the ram 108. Thus, when the ram 108 is stopped at a certain location, the beam 106 can selectively irradiate the powder layer disposed under the passageway 110. As depicted in FIG. 21, the beam 106 may irradiate the powder 104 in a series of different hatching patterns 157, including, e.g., a first hatching pattern 157A, a second hatching pattern 157B, and a third hatching pattern 157C. Any number of different hatching patterns 157, shapes, and sizes may be possible in any arrangement within the powder 104. Use of different hatching patterns 157 may break up long lines of continuous laser scanning to decrease thermal stress concentrations in the layer.

Movement of the ram 108 within the powder 104 can occur in a desired manner in view of the layer currently being irradiated. In certain instances, the speed of the ram 108 translating through the powder 104 can be similar to the speed of the beam 106 moving within the passageway 110. In other instances, the beam 106 may move within the passageway 110 faster than the ram 108 moves within the powder 104. In yet other instances, the ram 108 may move within the powder 104 faster than the beam 106 moves within the passageway 110. In some embodiments, the beam 106 may cease for durations while the ram 108 is moved over blank areas where irradiation is not to occur.

Additive manufacturing systems 100, in accordance with one or more embodiments described herein, may allow for additive manufacturing operations to occur without conventional recoating steps used by conventional additive manufacturing, i.e., sintering, technologies. That is, systems 100 described herein can operate without requiring recoating steps where a blade scans over powder to form a new sheet (or layer) of powder for fusing. Advantageously, this allows for quicker additive manufacturing processes and allows for the creation of complex geometries and parts. Moreover, use of shorter blades of the ram 108 reduce deflection, vibration, and damage, which is a significant challenge in conventional additive manufacturing systems.

Figure 22:
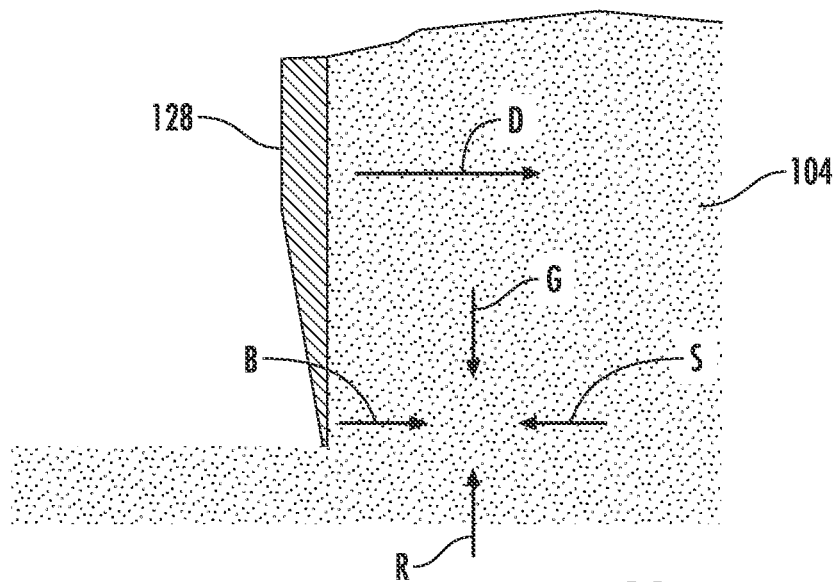
FIG. 22 is a schematic force diagram illustrating forces acting on the powder as the ram moves within the build volume.

FIG. 22 illustrates a view of forces on powder 104 being groomed or bladed by the blade 128 as the ram 108 moves in the direction D through the powder 104. As shown, the ram 128 generates blade pressure B in the direction D of travel while the side of the build volume 102 (FIG. 1) and powder 104 create a counter side reaction S in a direction generally opposite the direction D. Meanwhile, gravity G maintains the powder 104 in place by providing a downward force thereon, i.e., in the Z-direction, while the bottom reaction force R provided by the bottom of the build volume 1-2 and powder 104 support the powder 104 in the upward direction. These forces act together to create a smooth powder surface where irradiation can occur. At least some of these forces can be modified or adjusted, e.g., by rotating the build volume 102 or adjusting the speed of travel of the ram 108, through powder selection and distance to the perimeter of the build volume 102, and the like. Accordingly, desirable surface properties can be achieved in view of the requirements of the additively manufactured article.

Figure 23:
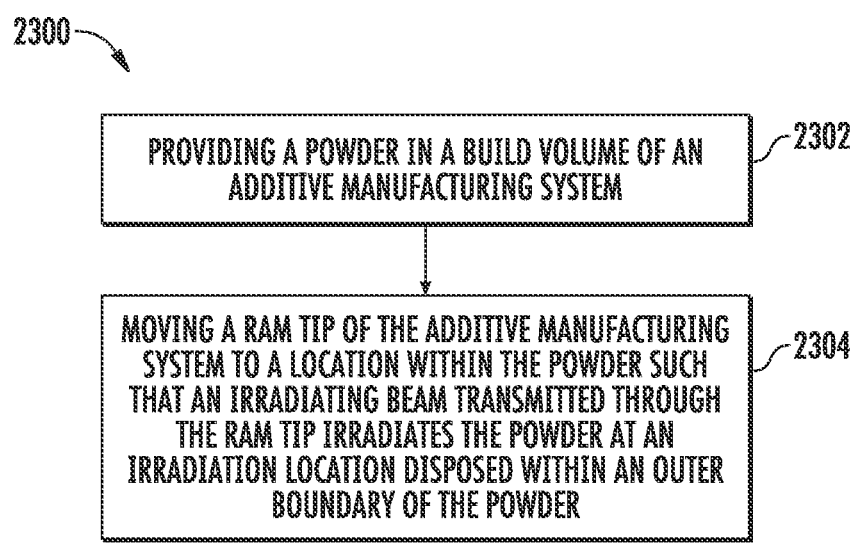
FIG. 23 is a flow chart of a method of additive manufacturing in accordance with an exemplary embodiment of the present disclosure.

FIG. 23 depicts a flow chart of a method 2300 of additive manufacturing. The method 2300 includes a step 2302 of providing a powder in a build volume of an additive manufacturing system and a step 2304 of moving a ram tip of the additive manufacturing system to a location within the powder such that an irradiating beam transmitted through the ram tip irradiates the powder at an irradiation location disposed within an outer boundary of the powder. In an embodiment, the method 2300 can further include a step of generating the irradiating beam such that the irradiating beam is transmitted to the ram tip, and moving the ram such that the ram tip moves within the powder to create an additively manufactured component.

In an embodiment, the ram can include one or more blades. The method 2300 can further include adjusting the one or more blades and changing a direction of travel of the ram. In certain instances, adjusting the blades can maintain a clearance between the ram tip and the powder, e.g., when the ram changes direction.

Further aspects of the invention are provided by one or more of the following embodiments and combinations thereof:

Embodiment 1. An additive manufacturing system including a build volume; a powder disposed in the build volume, the powder occupying at least a portion of the build volume and having an outer boundary; a beam generator configured to generate a beam to irradiate the powder; and a ram defining a passthrough configured to transmit the beam to an irradiation location disposed within the outer boundary of the powder.

Embodiment 2. The system of any one or more of the embodiments, wherein the build volume has at least four mechanical degrees of freedom.

Embodiment 3. The system of any one or more of the embodiments, wherein the build volume is rotatable about at least one rotation axis.

Embodiment 4. The system of any one or more of the embodiments, wherein the build volume includes: a base; and a plurality of sidewalls extending from the base, wherein at least one of the plurality of sidewalls is moveable relative to the base.

Embodiment 5. The system of any one or more of the embodiments, wherein a location of the beam is moveable with respect to the passthrough.

Embodiment 6. The system of any one or more of the embodiments, wherein the ram is moveable within the build volume, and wherein the irradiation location remains within the outer boundary of the powder during an entire manufacturing operation.

Embodiment 7. The system of any one or more of the embodiments, wherein the ram includes a ram tip, and wherein the ram tip is configured to be spaced apart from the powder.

Embodiment 8. The system of any one or more of the embodiments, wherein the ram further includes at least one blade configured to form a clearance between the ram tip and the powder.

Embodiment 9. The system of any one or more of the embodiments, wherein the at least one blade is moveable.

Embodiment 10. The system of any one or more of the embodiments, wherein the at least one blade includes a ramped surface.

Embodiment 11. The system of any one or more of the embodiments, wherein the passthrough contains an inert or nitrogen gas or operates in a vacuum state.

Embodiment 12. The system of any one or more of the embodiments, wherein the ram includes a ram tip, and wherein the system further includes an end cover configured to selectively cover the ram tip.

Embodiment 13. The system of any one or more of the embodiments, wherein one or more pre-installed features are receivable in the build volume prior to initiating a manufacturing operation.

Embodiment 14. A method of additive manufacturing, the method including: providing a powder in a build volume of an additive manufacturing system; and moving a ram tip of the additive manufacturing system to a location within the powder such that an irradiating beam transmitted through an opening in the ram tip irradiates the powder at an irradiation location disposed within an outer boundary of the powder.

Embodiment 15. The method of any one or more of the embodiments, further including: generating the irradiating beam such that the irradiating beam is transmitted to the ram tip; and moving the ram such that the ram tip moves within the powder to create an additively manufactured component.

Embodiment 16. The method of any one or more of the embodiments, further including: adjusting one or more blades of the ram; and changing a direction of travel of the ram, wherein adjusting the one or more blades maintains a clearance between the ram tip and the powder when the ram changes direction.

Embodiment 17. The method of any one or more of the embodiments, wherein the ram moves a distance beyond the additively manufactured component after completing a layer of the additively manufactured component and before starting a new layer of the additively manufactured component.

Embodiment 18. The method of any one or more of the embodiments, further including rotating the build volume about at least one rotation axis.

Embodiment 19. The method of any one or more of the embodiments, wherein the ram tip is disposed on an end of a ram, wherein the ram defines a passthrough configured to transmit the irradiating beam to the ram tip, and wherein the passthrough contains an inert or nitrogen gas or operates in a vacuum state.

Embodiment 20. The method of any one or more of the embodiments, further including: uncovering the ram tip at a time corresponding with the ram tip being located at the irradiation location.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An additive manufacturing system comprising:
   a build volume;
   a powder disposed in the build volume, the powder occupying at least a portion of the build volume and having an outer boundary;
   a beam generator configured to generate a beam to irradiate the powder;
   a ram insertable into the powder, the ram defining a ram tip and a passthrough that transmits the beam to an irradiation location disposed within the outer boundary of the powder to irradiate powder spaced apart from the outer boundary of the powder; and
   a removable cover that covers the ram tip while the ram is inserted into the powder, the removable cover being removed from the ram tip after the ram is inserted into the powder to allow transmission of the beam to the irradiation location.

2. The system of claim 1, wherein the build volume has at least four mechanical degrees of freedom.

3. The system of claim 2, wherein the build volume is rotatable about at least one rotation axis.

4. The system of claim 1, wherein the build volume comprises:
   a base; and
   a plurality of sidewalls extending from the base,
   wherein at least one of the plurality of sidewalls is moveable relative to the base.

5. The system of claim 1, wherein a location of the beam is moveable with respect to the passthrough.

6. The system of claim 1, wherein the ram is moveable within the build volume, and wherein the irradiation location remains within the outer boundary of the powder during an entire manufacturing operation.

7. The system of claim 1, wherein the ram defines a front blade and a rear blade in a direction of motion, and wherein the rear blade is spaced apart from the powder as the ram moves laterally within the build volume in the direction of motion.

8. The system of claim 1, further comprising a guide coupled to the ram at a first side of the ram and a second side of the ram opposite the first side, the guide configured to apply a compression force against the powder as the ram moves relative to the build volume.

9. The system of claim 8, wherein the ramped surface extends continuously around the circumference of the ram.

10. The system of claim 8, wherein the ramped surface is angularly offset from a horizontal plane by an angle that is at least 10°.

11. The system of claim 1, wherein the passthrough contains an inert gas or operates in a vacuum state.

12. The system of claim 1, wherein the removable cover is coupled to a rod, the rod extending from the ram tip to a location outside of the powder while the ram is inserted into the powder.

13. The system of claim 1, wherein one or more pre-installed features are receivable in the build volume prior to initiating a manufacturing operation.

14. A method of additive manufacturing, the method comprising:
providing a powder in a build volume of an additive manufacturing system, the powder having an outer boundary, and the additive manufacturing system comprising a beam generator configured to generate an irradiating beam that transmits through a passthrough of a ram to irradiate the powder;
inserting the ram into the powder; and
removing a removable cover that covers a ram tip of the ram while the ram is inserted into the powder, the removable cover being removable from the ram such that the irradiating beam is transmitted through an opening in the ram tip to irradiate the powder at an irradiation location disposed within an outer boundary of the powder.

15. The method of claim 14, further comprising:
generating the irradiating beam such that the irradiating beam is transmitted to the ram tip; and
moving the ram such that the ram tip moves within the powder to create an additively manufactured component.

16. The method of claim 15, further comprising:
adjusting one or more blades of the ram; and
changing a direction of travel of the ram,
wherein adjusting the one or more blades maintains a clearance between the ram tip and the powder when the ram changes direction.

17. The method of claim 15, wherein the ram moves a distance beyond the additively manufactured component after completing a layer of the additively manufactured component and before starting a new layer of the additively manufactured component.

18. The method of claim 14, further comprising rotating the build volume about at least one rotation axis.

19. The method of claim 14, wherein the ram has a guide coupled to the ram at a first side of the ram and a second side of the ram opposite the first side, the guide configured to apply a compression force against the powder as the ram moves relative to the build volume.

20. The method of claim 14, further comprising:
uncovering the ram tip at a time corresponding with the ram tip being located at the irradiation location.

* * * * *